E. H. FRICKEY.
GRINDING SURFACE OR CAGE.
APPLICATION FILED MAY 18, 1908.
944,780.
Patented Dec. 28, 1909.
3 SHEETS—SHEET 2.
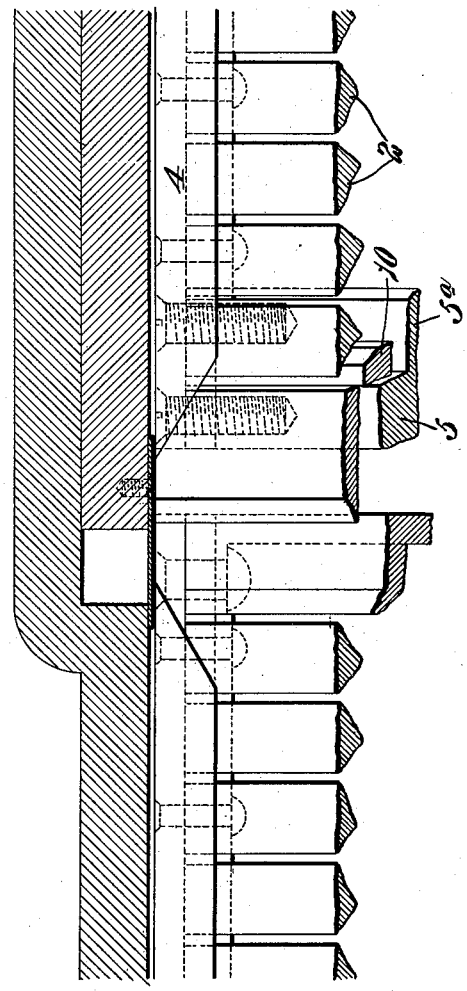
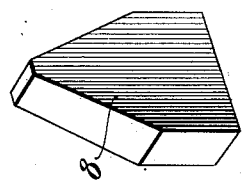
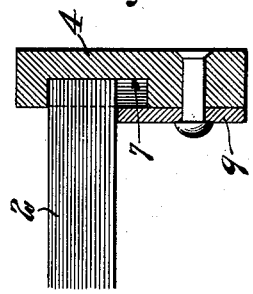
Witnesses:
Inventor,
Edward H. Frickey.

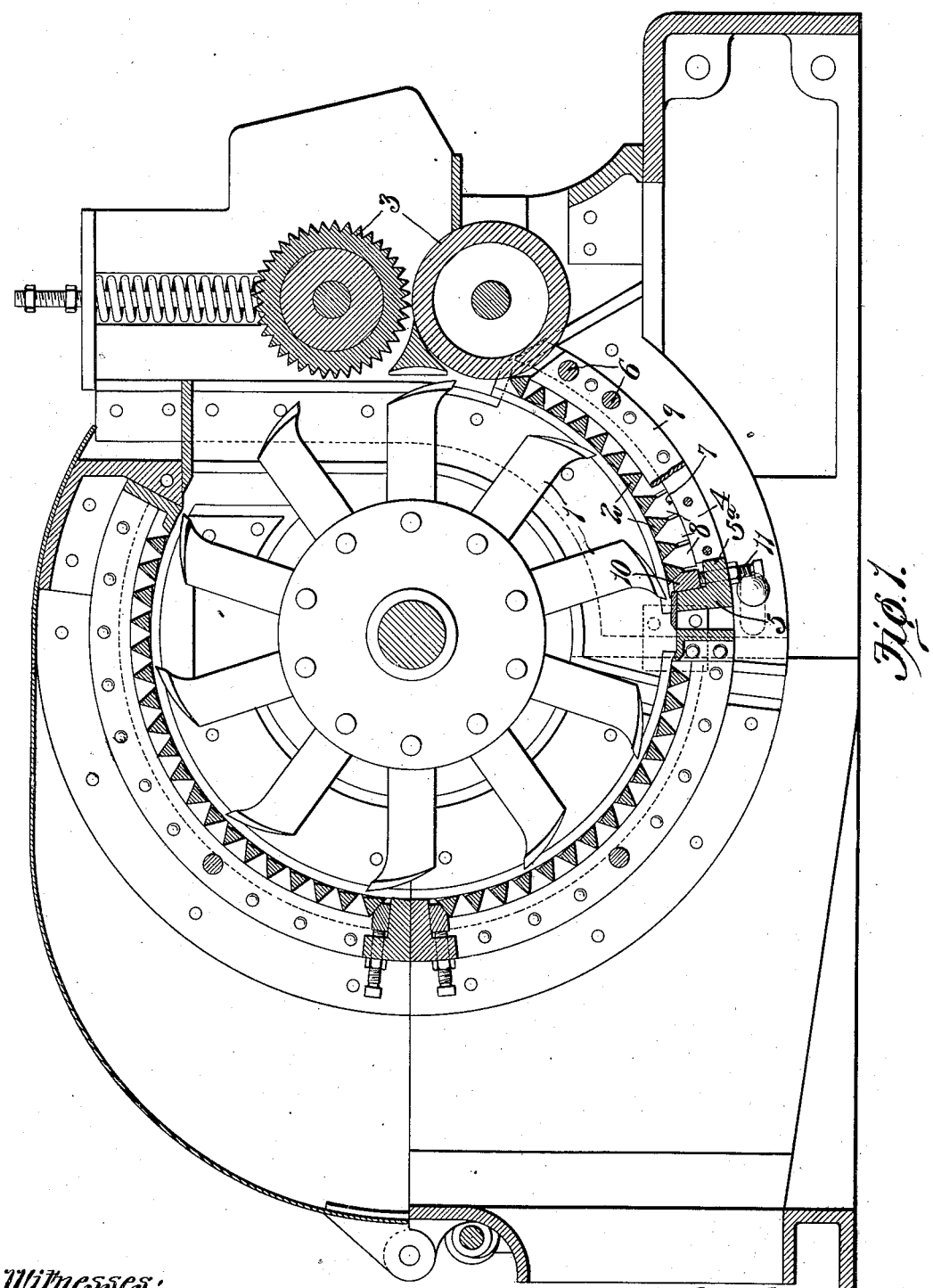

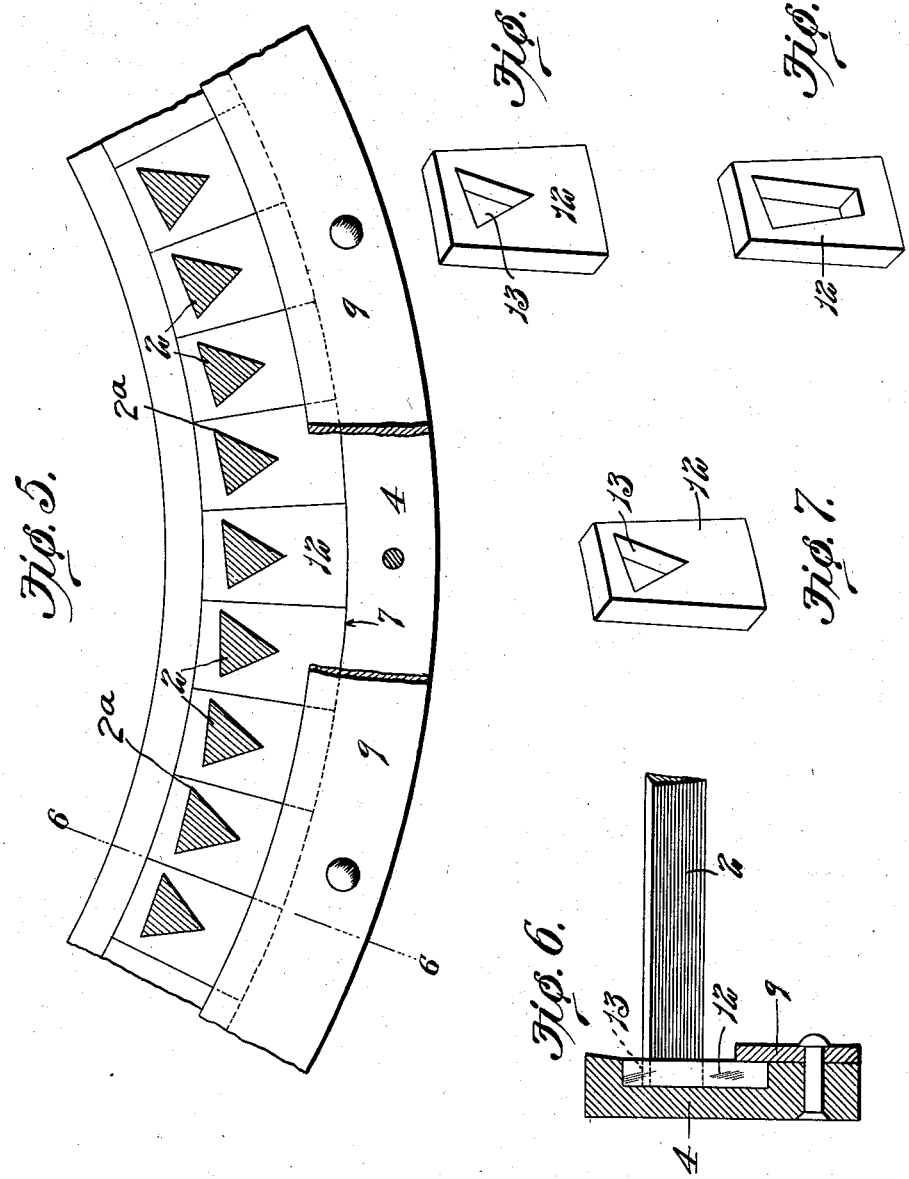

UNITED STATES PATENT OFFICE.

EDWARD H. FRICKEY, OF ST. LOUIS, MISSOURI, ASSIGNOR TO WILLIAMS PATENT CRUSHER & PULVERIZER COMPANY, OF ST. LOUIS, MISSOURI, A CORPORATION OF MISSOURI.

GRINDING-SURFACE OR CAGE.

944,780.  Specification of Letters Patent.  Patented Dec. 28, 1909.

Application filed May 18, 1908. Serial No. 433,546.

*To all whom it may concern:*

Be it known that I, EDWARD H. FRICKEY, a citizen of the United States, residing at St. Louis, Missouri, have invented a certain new and useful Improvement in Grinding-Surfaces or Cages, of which the following is a full, clear, and exact description, such as will enable others skilled in the art to which it appertains to make and use the same, reference being had to the accompanying drawings, forming part of this specification, in which—

Figure 1 is a vertical sectional view of a shredding machine provided with a grinding surface constructed in accordance with my invention; Fig. 2 is a top plan view of a portion of said grinding surface, the side walls of the casing of the machine being in section; Fig. 3 is a cross sectional view of one of the side members of the supporting frame of the cage; Fig. 4 is a perspective view of one of the blocks on which the cage bars rest; Fig. 5 is a detail view of a modified form of my invention; Fig. 6 is a cross sectional view taken on the line 6—6 of Fig. 5; and Figs. 7, 8 and 9 are perspective views of blocks that can be used for supporting the cage bars.

This invention relates to crushers and shredding machines, and particularly to the grinding surfaces or cages of such machines.

The main object of my invention is to provide a grinding surface or cage which consists of a plurality of transversely extending cage bars, a supporting frame, and devices carried by said frame for supporting said bars and holding them spaced away from each other to provide openings or spaces through which the material being operated on can pass.

Referring to Fig. 1 of the drawings which shows my improved cage in operative position in a shredding machine, 1 designates the rotating hammers or cutting members of the machine, and 2 designates the transversely extending cage bars of my improved cage or grinding surface. The machine herein shown is provided with a circular grinding surface that is composed of three separate sections all of which are of the same construction so that I will describe only the section that is located adjacent the feed rolls 3 which feed the material into the machine. Said section comprises a supporting frame which consists of two segmental-shaped members 4 that have their lower ends connected together by a transversely extending bar 5 and their upper ends connected together by one or more transversely extending bars or rods 6, said supporting frame being slidingly mounted between plates that are connected to the side walls of the casing of the machine. The side members 4 of the supporting frame are provided on their inside faces with grooves 7, as shown in Fig. 3, into which the ends of the transversely extending cage bars 2 project, and blocks 8 rest on the bottoms of said grooves to support the cage bars and space them away from each other to provide openings through which the shredded material can pass, as shown in Fig. 2. The cage bars 2, shown in Fig. 1, are of triangular shape in cross section and the upper ends of the blocks 8 are approximately wedge-shaped, as shown in Fig. 4, so that they will pass between two cage bars, the wedge-shaped portion of each block 8 being so formed that a space will be formed between the bars when the bars and blocks are clamped together. The blocks 8 are retained in operative position in the grooves on the inside faces of the side members 4 by means of keepers or plates 9 connected to the inside faces of said side members and projecting upwardly above the lower edges of the grooves 7 therein, as shown in Fig. 3.

The cage bar 2 at the upper end of the supporting frame or the blocks 8 on which said bar rests abuts against part of the supporting frame, and the cage bar 2 at the lower end of said supporting frame contacts with an adjustable clamping wedge 10 which is supported on screws 11 adjustably mounted in a flange 5ª on the bar 5 at the lower end of the supporting frame. The clamping wedge 10 can be forced upwardly by turning the screws 11 so as to move the cage bars 2 and blocks 8 longitudinally of the grooves in the side members of the supporting frame and thus clamp said bars and blocks together, the upward movements of the cage bars being limited by the upper edges of the grooves in the side members 4. Preferably, the cage bars are so arranged that one edge of each bar will form a cutting edge 2ª, as shown in Fig. 5, that coöperates with the cutting members 1 of the machine and when said edges become worn the screws 11 can be manipulated to release said cage bars so that they can be turned to bring another edge into operative position.

Instead of using wedge-shaped blocks 8 on which the cage bars rest, as shown in Fig. 1, I can use blocks 12 provided with openings 13 into which the ends of the cage bars project, as shown in Figs. 5, 6 and 7. In a construction of this description I can vary the width of the spaces or openings between the cage bars by substituting blocks 12 of different width, as shown in Fig. 8. While I have herein shown a cage provided with bars of triangular shape in cross section, it will, of course, be obvious that bars of a different cross sectional shape can be employed without departing from the spirit of my invention, the blocks 12 which support the ends of the bars being provided with openings that conform to the cross sectional shape of the bars, as shown in Fig. 9.

Having thus described my invention, what I claim as new and desire to secure by Letters Patent is:

1. A cage for grinding machines, comprising rigid side members provided on their inner faces with grooves, transversely extending cage bars projecting into said grooves, independently movable blocks arranged in said grooves for supporting said cage bars and spacing them away from each other, keepers connected to said side members for retaining the blocks in said grooves, and adjustable means for moving said blocks longitudinally of the grooves to clamp the cage bars in position; substantially as described.

2. A cage for grinding machines, comprising side members provided on their inside faces with grooves, blocks mounted in said grooves, cage bars resting on said blocks, a transversely extending bar connecting one end of said members together, a flange on said bar, adjusting screws mounted in said flange, and a wedge-shaped clamping member adapted to be actuated by said screws for clamping the cage bars and their supporting blocks in position; substantially as described.

3. A machine of the character described, provided with a grinding surface consisting of a number of sections, each of which comprises a segmental shaped frame, cage bars which extend transversely of said frame, independently movable blocks resting on said frame and contacting with the end portions of said bars to support them and space them apart, and an adjustable wedge interposed between the end of the frame and one of the cage bars for moving the blocks longitudinally of the frame to clamp said bars in position; substantially as described.

4. A cage for grinding machines comprising a segmental supporting frame, there being grooves formed in the inner faces of the said members of said frame, cage bars having their ends seated in said grooves which cage bars are triangular in cross section, independently movable spacing blocks arranged in the grooves between the cage bars for spacing and supporting the same, the inner ends of which spacing blocks are wedge shaped in order to engage the faces of the cage bars, a rigid bar connecting the segmental side members at one end, a wedge bar arranged on said rigid bar and bearing against the adjacent cage bar and adjusting screws arranged in the rigid bar and engaging against the wedge bar.

5. The combination with a shredding machine employing pivoted rotating beaters, of a cage comprising a series of segmentally shaped frames, there being grooves formed on the inner faces of said frames, a series of cage bars for each frame, the ends of which cage bars occupy the grooves in the frame, spacing blocks located within the grooves and engaging the ends of the cage bars, segmental plates fixed to the inner faces of the side members of the frame and projecting over the grooves therein for holding the spacing blocks in said grooves, and an adjustable wedge bar at the end of each segmental frame for moving the cage bars and clamping the same in position for use.

6. The combination with a shredding machine employing pivoted rotating beaters, of a cage comprising a series of segmentally shaped frames, a rigid transverse bar at the end of each frame, there being grooves formed in the inner faces of the side members of each frame, a series of cage bars for each frame, the ends of which cage bars occupy the grooves, independently movable spacing blocks located in the grooves and bearing against the ends of the cage bars, and segmental plates on the inner faces of the frames, which plates extend over the grooves in said frames and hold the spacing blocks therein, a wedge bar arranged on each rigid transverse bar and engaging the face of the adjacent cage bar and set screws passing through the rigid transverse bars and bearing against the wedge bars, whereby the same may move upward to clamp the cage bars in position for use.

In testimony whereof I hereunto affix my signature in the presence of two witnesses, this thirteenth day of May 1908.

EDWARD H. FRICKEY.

Witnesses:
MILTON F. WILLIAMS,
GEORGE BAKEWELL.